(12) United States Patent
Andersson et al.

(10) Patent No.: US 9,317,702 B2
(45) Date of Patent: Apr. 19, 2016

(54) SYSTEM AND METHOD FOR PROVIDING SECURE INTER-PROCESS COMMUNICATIONS

(71) Applicant: Sony Mobile Communications AB, Lund (SE)

(72) Inventors: Stefan Andersson, Klagerup (SE); Petter Wallin, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 23 days.

(21) Appl. No.: 13/995,129

(22) PCT Filed: Nov. 21, 2012

(86) PCT No.: PCT/IB2012/056603
§ 371 (c)(1),
(2) Date: Jun. 17, 2013

(87) PCT Pub. No.: WO2013/080096
PCT Pub. Date: Jun. 6, 2013

(65) Prior Publication Data
US 2014/0059357 A1    Feb. 27, 2014

Related U.S. Application Data

(60) Provisional application No. 61/564,457, filed on Nov. 29, 2011.

(51) Int. Cl.
G06F 21/60    (2013.01)

(52) U.S. Cl.
CPC ............ G06F 21/602 (2013.01); G06F 21/606 (2013.01)

(58) Field of Classification Search
None
See application file for complete search history.

(56) References Cited

U.S. PATENT DOCUMENTS

| | | | |
|---|---|---|---|
| 2001/0044904 A1* | 11/2001 | Berg et al. ................ 713/201 |
| 2004/0236956 A1* | 11/2004 | Shen .................... H04N 7/1675 713/193 |
| 2005/0068992 A1* | 3/2005 | Kaku ................. H04N 7/17336 370/535 |
| 2005/0182966 A1 | 8/2005 | Pham et al. |
| 2005/0223412 A1* | 10/2005 | Nadalin .............. G06F 21/6209 726/3 |
| 2007/0150959 A1* | 6/2007 | Ahdout et al. ................. 726/26 |
| 2007/0276958 A1* | 11/2007 | Curtis ................ H04L 63/0272 709/238 |
| 2009/0274300 A1* | 11/2009 | Tou ..................... H04L 63/0428 380/255 |
| 2010/0017593 A1* | 1/2010 | Putz ..................... H04L 9/3073 713/150 |
| 2010/0070770 A1* | 3/2010 | Flores .......................... 713/176 |
| 2012/0063595 A1* | 3/2012 | Massoudi ............ H04N 7/1675 380/210 |

OTHER PUBLICATIONS

Menezes, et al., "Data integrity and message authentication", Handbook of Applied Cryptography; CRC Press Series on Discrete Mathematices and Its Applications, Jan. 1997, pp. 359-361, 497-499, 552, 568-569, CRC Press, Boca Raton, FL, USA. XP-002245801.

* cited by examiner

Primary Examiner — Michael R Vaughan
(74) Attorney, Agent, or Firm — Coats & Bennett, PLLC

(57) ABSTRACT

A user device provides a mechanism for securing messages communicated between trusted processes along an established Inter-Process Communication (IPC) channel. The mechanism permits the trusted processes to determine which messages to protect, and executes independently of platform-dependent IPC mechanisms.

21 Claims, 7 Drawing Sheets

SYSTEM AND METHOD FOR PROVIDING SECURE INTER-PROCESS COMMUNICATIONS

RELATED APPLICATIONS

This application claims priority to U.S. Provisional Patent Application Ser. No. 61/564,457, filed Nov. 29, 2011, which is incorporated herein by reference.

FIELD OF THE INVENTION

The present invention relates generally to user devices, such as mobile communication devices, and particularly to systems and methods for securing inter-process communications on such devices.

BACKGROUND

Consumer electronic devices, such as mobile communication devices and portable computing devices, are becoming very powerful in terms of functionality and computing ability. Thanks to such increasing power, current devices are now able to execute applications that perform a variety of different functions. For example, in addition to the conventional communication related functions they normally perform, many devices include applications that render multimedia to the user, such as video and audio, thereby enhancing a user's enjoyment of the device.

The ability to render audio and video also allows content providers to take advantage of a growing revenue stream. For example, content providers can now make premium multimedia content available to user for consumption on their personal devices. In some cases, that content may be provided in High Definition (HD) to a device that is capable of rendering such content. However, there are problems associated with existing methods of rendering multimedia content. Particularly, there are situations where the processes required to render the multimedia content do not completely protect the content from malicious applications. Thus, the content remains vulnerable to eavesdropping, and to being stolen for later rendering by unauthorized devices.

In more detail, a plurality of processes typically execute on a single user device whenever a user launches an application, such as an application that renders video and/or audio, for example. These processes are not the higher-level "user applications" that the user can actively launch and control, but rather, are the associated "lower-level" processes that launch and perform their intended operations on the content or data without any direct user involvement or knowledge. These processes may be directly associated with the user application, or may be part of the operating system (OS) on which the user applications run. By way of example, some low-level processes associated with audio/video applications will perform well-known data decryption and rendering functions to render the content to the user. Although the user may not be aware that the processes are executing, they do so nonetheless so that the user can enjoy the content.

Generally, while performing their intended functions, such low-level processes communicate with each other using well-known inter-process communication (IPC) mechanisms to pass the data and other information in messages. Although the processes may not explicitly open the data being passed to the outside world, there are still many opportunities for malicious applications to eavesdrop on the communicated messages and record the data. Once recorded, the malicious applications store the data to some other memory where it can then be retrieved and rendered without the user's or the owner's knowledge or consent. Additionally, the messages communicated between the low-level processes are vulnerable to replay attacks, or being modified without user's or owner's knowledge.

The data communicated between low-level processes associated with multimedia applications is not the only type of data that is vulnerable to such malicious eavesdropping attacks. In fact, any type of data communicated between two or more low-level processes is vulnerable to such attacks. By way of example, many users access financial or other protected information on network servers from their user devices. Although the messages communicated between the user device and the server may be secure, the messages communicated between the low-level processes associated with the user-level applications may not be secure from malicious applications executing on the user's device.

There are many different types of solutions that attempt to prevent such malicious applications from ever being installed on a user device in the first place. However, there is no solution that completely prevents all such unwanted installations. Further, many times, a user is not aware that a malicious application is currently executing on the device and stealing content. This is troublesome for content providers, who may not release premium content without increased and more stringent security measures, as well as for anyone who wishes to keep certain data secret.

SUMMARY

The present invention provides a system and method for securing inter-process communications (IPC) on a user device, such as a cellular telephone or a tablet computing device, for example. The invention helps to prevent malicious applications, which may be installed on the user device, from eavesdropping on communications that occur between low-level processes executing on the device and stealing data.

In one embodiment, the user device includes a software module comprising an application programming interface (API). Low-level processes that are executing on the user device call the functions in the API to selectively protect messages that are communicated between the low-level processes.

In one or more embodiments, the present invention provides a method for providing secure Inter-Process Communications (IPC) between first and second processes executing on a same user device. The method comprises establishing an IPC channel between first and second processes executing on a same user device, wherein the IPC channel is configured to carry messages sent by the first process to the second process. For each message to be sent to the second process, the method selectively determines whether the message is to be protected and encrypts the message based on the determination. The result is a message comprising an encrypted portion and an unencrypted portion. The method then sends the message to the second process over the established IPC channel.

In one embodiment, the method initializes an instance of a security function on the user device. The security function is accessible to both the first and second processes.

Additionally, the method comprises initializing selected parameter values to provide as input into the security function to protect against replay attacks on the messages being sent to the second process over the IPC channel.

In one embodiment, the method selectively determines whether a message is to be protected by determining whether the message includes data that is to be protected.

In such cases, the method encrypts only the portion of the message that includes the data to be protected.

In another embodiment, encrypting the message comprises generating a unique key for the message based on a parameter value generated by the first process. Generating the unique key comprises providing a security function executing on the user device with the parameter value, receiving the unique key from the security function, and updating the parameter value to use in generating another unique key to encrypt a subsequent message.

In one embodiment, the first and second processes comprise trusted processes, and establishing the IPC between the first and second processes comprises establishing the IPC channel through an untrusted process executing on the user device.

The present invention also provides a user device comprising a memory and a programmable controller communicatively connected to the memory. In one or more embodiments, the controller is configured to establish an IPC channel between first and second processes executing on the user device, wherein the IPC channel is configured to carry messages sent by the first process to the second process. For each message to be sent to the second process, the controller is configured to selectively determine whether the message is to be protected and encrypt the message based on the determination such that the message comprises an encrypted portion and an unencrypted portion. The controller is also configured to send the message to the second process over the established IPC channel.

In one embodiment, the memory is configured to store a security function accessible to both the first and second processes. In such cases, the programmable controller is further configured to initialize an instance of the security function.

In one embodiment, the programmable controller is further configured to initialize selected parameter values to input into the security function to protect against replay attacks on the messages being sent to the second process over the IPC channel.

Additionally, the programmable controller is configured to selectively determine whether a message is to be protected by determining whether the message includes data that is to be protected.

The programmable controller may be configured, in at least one embodiment, to encrypt only the portion of the message that includes the data to be protected.

In one embodiment, the programmable controller is further configured to generate a unique key for the message based on a parameter value generated by the first process. To generate the unique key, the programmable controller is configured to provide a security function executing on the user device with the parameter value, receive the unique key from the security function, and update the parameter value to use in generating another unique key to encrypt a subsequent message.

In one or more embodiments, the first and second processes comprise trusted processes. Thus, the programmable controller is configured to establish the IPC between the first and second processes by establishing the IPC channel through an untrusted process executing on the user device.

In addition, the present invention also provides a method for providing secure Inter-Process Communications (IPC) between first and second processes executing on a same user device. In one embodiment, the method comprises receiving a message over IPC channel from the first process wherein the message comprises an encrypted portion and an unencrypted portion, comparing a parameter value received with the message to an expected parameter value maintained by the second process, and decrypting the encrypted portion of message based on the comparison.

In one embodiment, decrypting the encrypted portion of message based on the comparison comprises decrypting the encrypted portion of the message if the parameter value received with the message equals or exceeds the expected value maintained by the second process.

In one embodiment, the method further comprises initializing an instance of a security function on the user device, wherein the security function is accessible to both the first and second processes.

In one embodiment, the method further comprises initializing selected parameter values to provide as input into the security function to protect against replay attacks on the messages received over the IPC channel.

In one or more embodiments, the method further comprises generating a key for the received message by providing a security function executing on the user device with the parameter value received with the message, receiving the key from the security function in which the key is unique to the received message and is the same key that was used by the first process to encrypt the message, and updating the expected parameter value to use in comparing another parameter received with a subsequent message over the IPC channel.

Additionally, the present invention also provides a user device comprising a memory and a programmable controller. In one embodiment, the programmable controller is configured to execute first and second processes on the user device, establish an IPC channel between the first and second processes, receive a message sent by the first process over the IPC channel to the second process, in which the message comprises an encrypted portion and an unencrypted portion, compare a parameter value received with the message to an expected parameter value maintained by the second process, and decrypt the encrypted portion of message based on the comparison.

In one embodiment, the programmable controller is configured to decrypt the encrypted portion of the message if the parameter value received with the message equals or exceeds the expected value maintained by the second process.

Additionally, the memory is configured to store a security function accessible to both the first and second processes. In one embodiment, the programmable controller is further configured to initialize an instance of the security function on the user device.

In one embodiment, the programmable controller is further configured to initialize selected parameter values to provide as input into the security function to protect against replay attacks on the messages received over the IPC channel.

In one embodiment, the programmable controller is further configured to provide a security function executing on the user device with the parameter value received with the message to generate a key for the received message, receive the key from the security function in which the key is unique to the received message and is the same key that was used by the first process to encrypt the message, and update the expected parameter value to use in comparing another parameter value received with a subsequent message from the first process over the IPC channel.

Of course, those skilled in the art will appreciate that the present invention is not limited to the above contexts or examples, and will recognize additional features and advantages upon reading the following detailed description and upon viewing the accompanying drawings.

DETAILED DESCRIPTION

Figure 1:
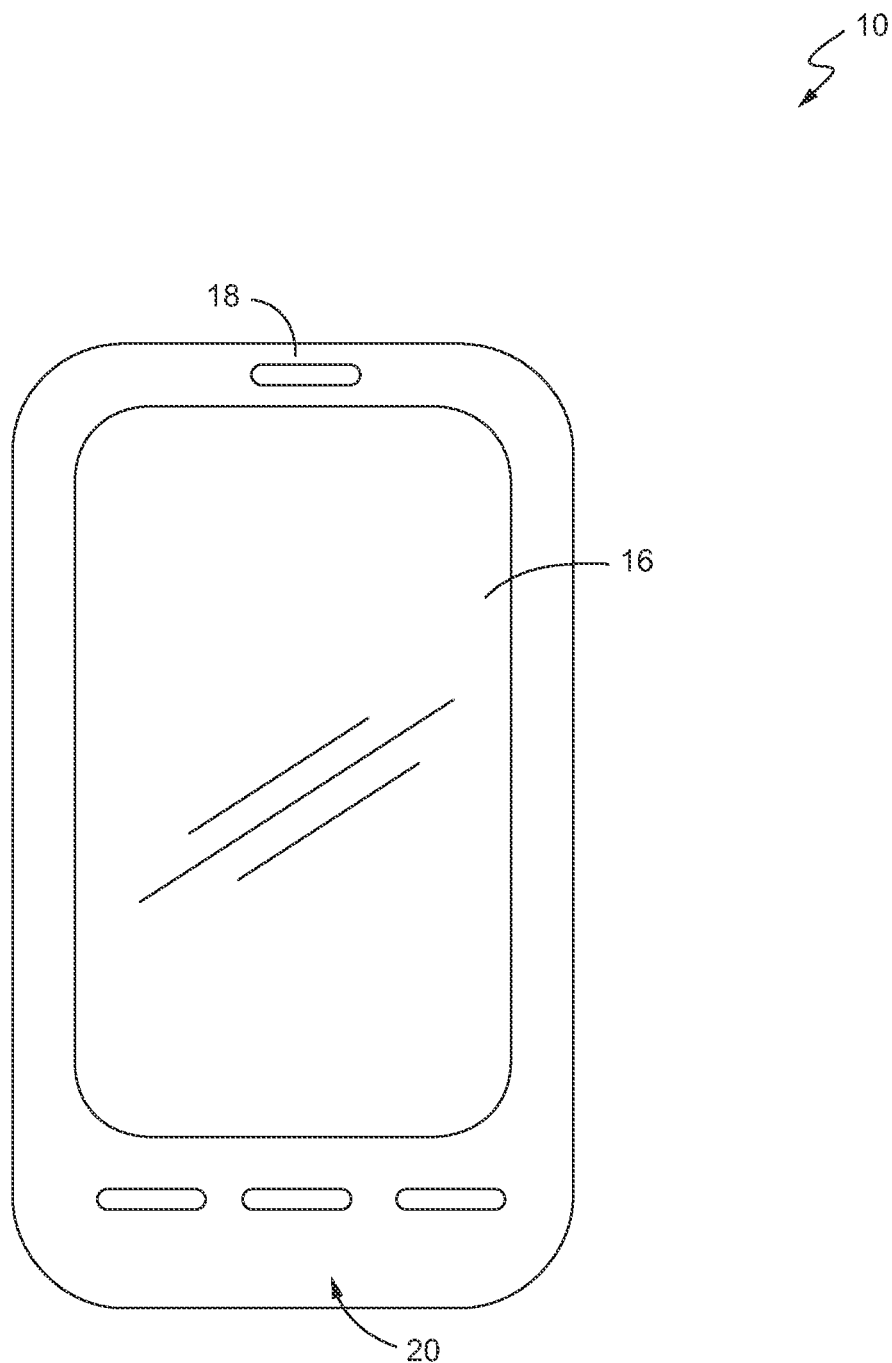
FIG. 1 is a perspective view of a cellular telephone suitable for use according to one embodiment of the present invention.

The present invention provides a hardware key based system and method for securing inter-process communications (IPC) on a user device, such as a cellular telephone or a tablet computing device, for example. The invention helps to prevent malicious applications, which may be installed on the user device, from eavesdropping on communications that occur between low-level processes executing on the device and stealing data. To accomplish this goal, the present invention provides a software module comprising an application programming interface (API) for the user device. The API includes a plurality of functions that are accessible to the low-level processes executing on the user device to secure the IPC between the low-level processes.

The functionality provided with the present invention differs from conventional methods with respect to protecting IPC in several aspects. For example, with conventional methods, processes that communicate with each other to protect the messages by establishing and maintaining a secure tunnel between them. However, this means that all messages are protected regardless of their importance and requires the dedicated use of precious resources. For some applications, like audio and/or video applications, protecting all messages and all the data within the messages in such a manner can adversely affect performance. The present invention avoids the need to protect all messages and all data by providing the capability for the low-level processes to selectively determine which messages need protecting. So determined, the low-level processes can protect only those messages and data within those selected messages, thereby decreasing complexity and reducing the impact on the device resources.

Another aspect of the present invention is that the API is generic and platform independent, unlike conventional packages that may be built specifically for a platform. This is especially beneficial because it allows the API to be instantiated on many different devices regardless of the specific IPC mechanisms that are used to communicate messages and data on those devices. For example, devices such as the APPLE iPHONE, the APPLE iPAD, and the ANDROID utilize very different platforms. Each platform, as is known in the art, is based on different code and utilizes different IPC mechanisms to facilitate the communication of data messages between low-level processes. Sometimes, even a single device can execute different IPC mechanisms for different processes. The API provided with the present invention does not alter the underlying IPC mechanisms already in use with these platforms, but rather, creates and uses its own messaging format to allow the low-level processes to be selective, and to provide them with more secure features for communicating data.

In another aspect, the present invention also protects the information and data (e.g., firmware) stored in the hardware of certain devices, while providing an easier, more straightforward manner in which to access this information and data. More particularly, processes that perform some function, such as rendering video, generally need to obtain a hardware key from a specific piece of hardware on the user device. Once obtained, the processes can use the obtained key in its operations. However, only trusted processes can access this key. Therefore, according to conventional wisdom, processes are required to first negotiate with one or more other hardware-related processes to gain access to the hardware key. Once access is obtained, the device needs space in memory to store the key, and then requires the resources to encrypt/decrypt data using the obtained key. Such methods are therefore complicated and time-consuming.

The present invention, however, obtains and stores the needed hardware keys upon instantiation on a user device, and then shares the key with the low-level processes that require access to the key. Thereafter, each low-level process that needs access to a hardware key to perform an intended function can access that data without having to separately negotiate with the hardware-related processes. Additionally, to add further protection, the present invention can selectively allow one or more low-level processes access to the data, selectively block one or more low-level processes from accessing the data, or simply enable/disable access to the data altogether. Further, in one embodiment, the present invention is implemented in a trusted execution environment, such as the well-known ARM TRUSTZONE. Such implementation would substantially eliminate the need to make the hardware keys available to the low-level processes.

Figure 2:
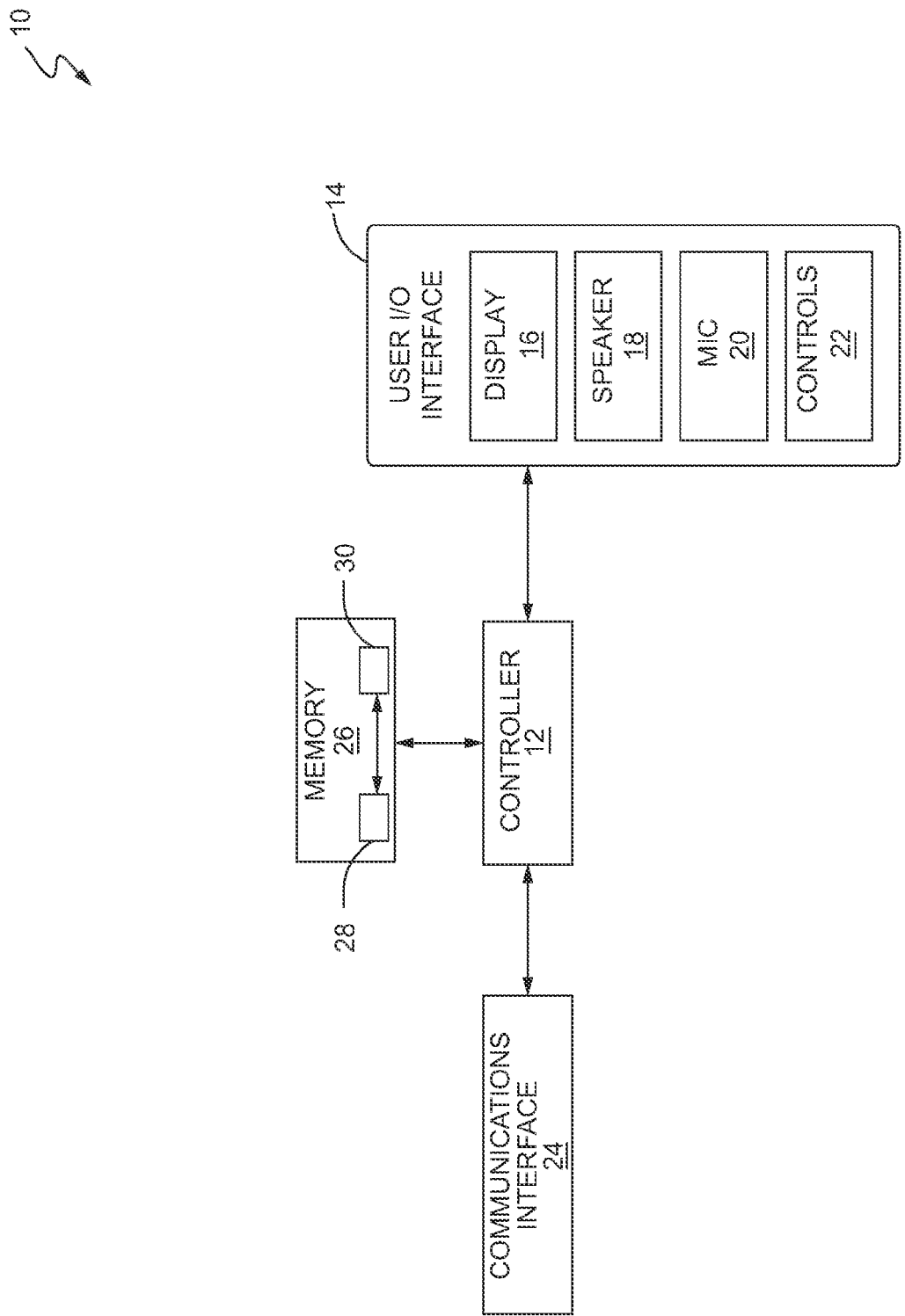
FIG. 2 is a block diagram illustrating some of the component parts of a user device configured according to one embodiment of the present invention.

Turning now to the drawings, FIGS. 1 and 2 illustrate an end user device 10 that is suitable for use in one embodiment of the present invention. As seen in these figures, device 10 is illustrated as being a cellular telephone, and more specifically, a Smartphone capable of launching and executing user-level applications such as video and audio applications. However, those skilled in the art should appreciate that the use of a cellular telephone to execute audio/video applications to describe the present invention is merely for illustrative purposes. The present invention may be utilized on any device that utilizes IPC mechanisms to communicate messages, and may be used to secure data and information other than just video and/or audio data.

As seen in FIGS. 1 and 2, device 10 comprises a controller 12 that communicatively connects a user I/O interface 14, a communications interface 24, and a memory 26. The user I/O interface 14 comprises a display 16, a speaker 18, a microphone 20, and one or more controls 22 to allow the user to enter input commands. As for the memory 26, it includes a protected area 28 and an API 30 that is instantiated on the user device 10 to perform one or more embodiments of the present invention. As is known in the art, device 10 may include other components and/or software modules; however, while it is understood that these other components and/or software modules may exist on device 10, they are not explicitly shown here for brevity.

Controller 12 generally controls the operation of the user device 10 according to programs and data stored in memory 26. Such programs and instructions include, but are not limited to, API 30. The control functions performed by controller 12 may be implemented, for example, in a single microprocessor, or in multiple microprocessors. Suitable microprocessors may include general purpose and special purpose microprocessors, as well as digital signal processors. Additionally, controller 12 may interface with an audio processing circuit (not shown) as is known in the art, to provide basic analog output signals to a speaker 18 and receive analog audio inputs from a microphone 20.

As is conventional, controller 12 is configured to launch and execute user-level applications responsive to user commands. For illustrative purposes only, one type of user-level application may be an audio/video application for rendering multimedia content on display 16 for the user. While executing the user-level application, the controller 12 may also launch one or more associated low-level processes to facilitate the data processing and rendering functions. As stated above, these low-level processes are often launched and executed autonomously and without direct user knowledge, and communicate data, such as video and/or audio content, in messages utilizing the IPC mechanisms available with the device 10.

The messages being communicated between processes may be intercepted and recorded for their data by malicious applications that eavesdrop on the established IPC channels. Therefore, according to the present invention, the controller 12 is configured to instantiate the API 30 so that the low-level processes can call the functions contained therein to selectively secure the messages being communicated across the IPC channels.

User I/O interface 14 provides a user with the necessary components to interact with the user device 10. As stated above, such components include display 16, speaker 18, microphone 20, and controls 22, which may include, but is not limited to, a keypad or buttons. The display 16 permits users to view dialed digits, call status, menu options, and service information typically associated with wireless communications, as well as to view video. In one embodiment, display 16 comprises a touch-sensitive display, and thus, is capable of providing a user with one or more touch-sensitive controls for operating device 10.

The communications interface 24 may comprise any transceiver for transmitting and receiving data, such as downloaded video and/or audio content, to and from a network server connected to an IP network, such as the Internet. Thus, in one embodiment, interface 24 comprises a fully functional cellular radio transceiver that operates according to any known standard. Such standards include, but are not limited to, the Global System for Mobile Communications (GSM), TIA/EIA-136, CDMAOne, CDMA2000, UMTS, and Wideband CDMA.

Alternatively, however, the communications interface 24 may comprise a short-range transceiver operating according to Wi-Fi standards, BLUETOOTH standards, or any standard associated with the IEEE 802.xx family of standards, or an Ethernet interface.

Memory 26 is a computer readable medium representing the entire hierarchy of memory in, or accessible to, device 10. Memory 26 may comprise both random access memory (RAM) and read-only memory (ROM), and may be implemented, for example, as one or more discrete devices, stacked devices, or removable devices, such as a flash drive or memory stick. In one embodiment, the memory 26 may be integrated with controller 12. As previously stated, the API 30 stored in memory 26 provides the functionality needed by the low-level processes being executed by controller 12 to secure their inter-process communications.

Figure 3:
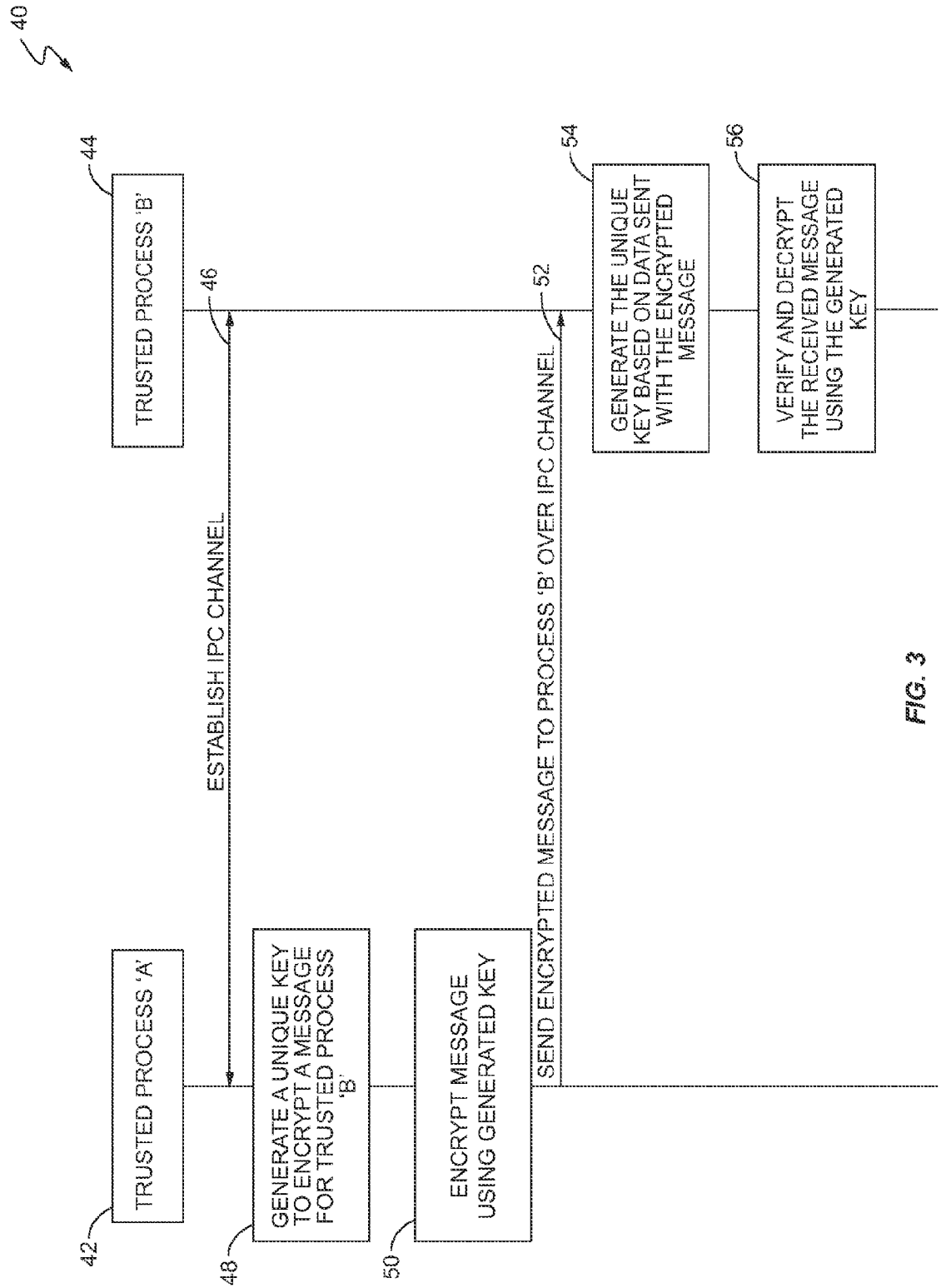
FIG. 3 is a signaling diagram illustrating the signaling that occurs between two processes executing on a user device configured according to one embodiment of the present invention.

FIG. 3 is a signaling diagram 40 illustrating how the present invention secures messages being communicated across an established IPC channel according to one embodiment of the present invention. Particularly, FIG. 3 illustrates two exemplary low-level processes 42, 44 that are assumed to be trusted—Trusted Processes 'A' and Trusted Process 'B'. These processes 42, 44 may be, for example, a pair of processes in a chain of low-level processes that are invoked by controller 12 to process and render multimedia data for display on display 16.

The method begins with the trusted processes 42, 44 establishing an IPC channel between them (line 46). The process for establishing and maintaining an IPC channel between two low-level processes is well-known in the art and not germane to the present invention. Therefore, the specifics of establishing an IPC channel are not described here in detail. It is sufficient to understand that such a communication channel has been established and is assumed to be present for the trusted processes 42, 44 to communicate messages.

When one of the trusted processes 42, 44 has data to send, which in this case is Trusted Process A, that process first makes a function call to API 30 to generate a unique key with which to encrypt the message for Trusted Process B (box 48). Once generated, the Trusted Process A encrypts the message for Trusted Process B (box 50) and sends the encrypted message to Trusted Process B via the established IPC channel (line 52). Upon receipt, Trusted Process B utilizes some of the information within the received message to generate the same key that was generated by Trusted Process A (box 54). After generating the same key, Trusted Process B verifies and decrypts the received message (box 56).

Thus, according to the present invention, a pair of trusted low-level processes 42, 44 can communicate messages over an established IPC channel. Further, the manner in which the messages are encrypted provides benefits not realized by conventional methods of inter-process communications. More specifically, the IPC mechanisms that control the transfer of messages between trusted processes 42, 44 are not negatively affected by the present invention. Rather, the present invention operates independently of these mechanisms regardless of the underlying platform. Further, the present invention assumes the responsibility for accessing the unique hardware key(s) used by the trusted processes 42, 44 and shares those key(s) with the trusted processes 42, 44. This means that each trusted process 42, 44 need not perform a complex and time consuming method of obtaining each key independently of the other processes. Additionally, the present invention provides the ability for each process 42, 44 to determine whether it will protect a given message, and if so, which messages it will protect. This deviates from conventional methods in which a secure channel is established and all messages are protected.

Figure 4:
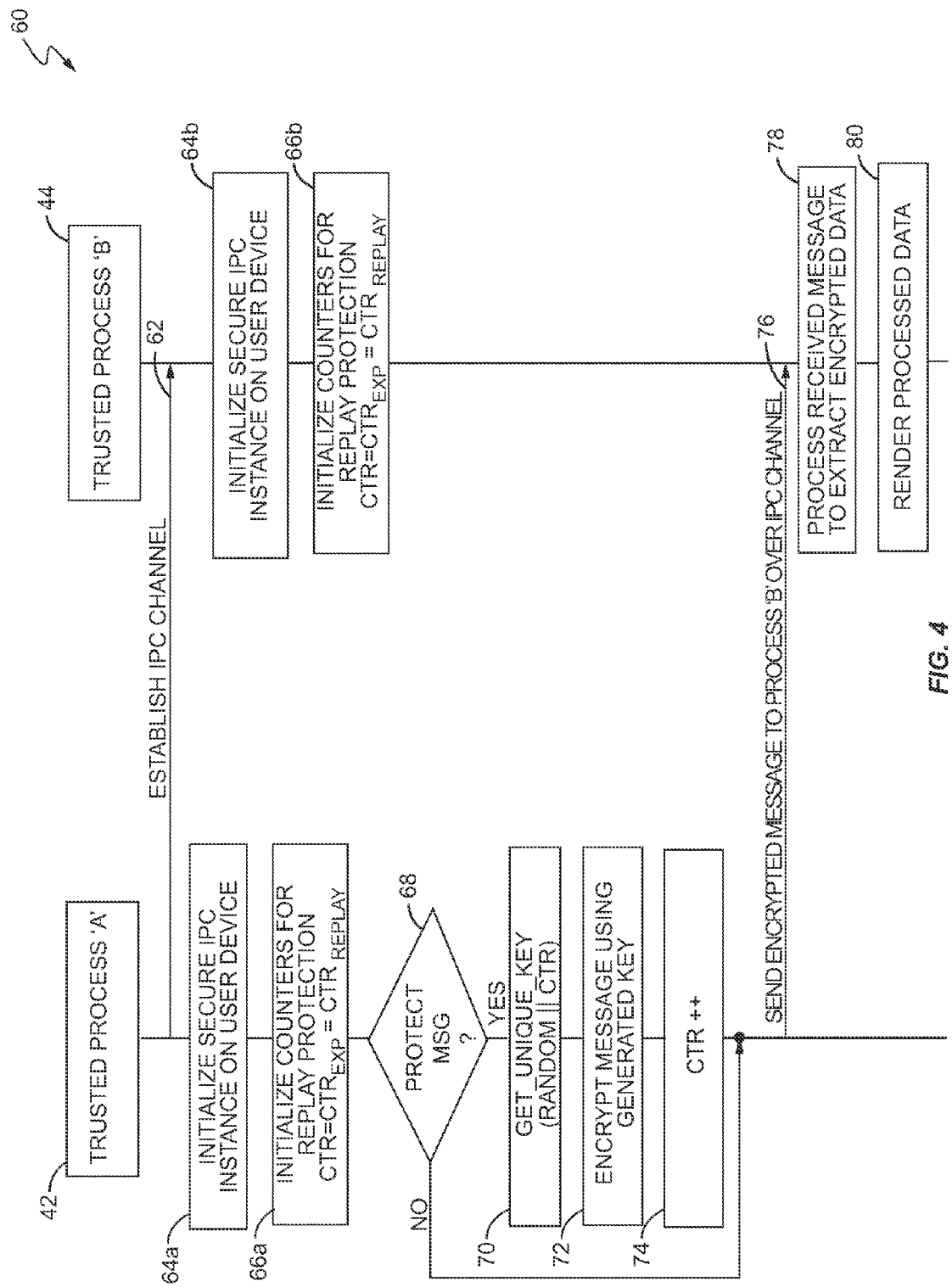
FIG. 4 is a signaling diagram illustrating how two processes executing on the same user device communicate secure messages over an established Inter-Process Communication (IPC) channel according to one embodiment of the present invention.

FIG. 4 is a signaling diagram illustrating a method 60 in which the two trusted processes 42, 44 communicate messages via IPC in more detail. As above, the method 60 assumes that an IPC channel is established between the two processes 42, 44 (line 62).

Method 60 begins when Trusted Process A and Trusted Process B are instantiated. Both Trusted Processes A and B are executed on the same user device, and both have been coded to make the appropriate calls via the API 30. Therefore, both Trusted Processes A and B perform the same initialization procedures. Particularly, Trusted Processes A and B initialize an instance of the secure API 30 on user device 10 (boxes 64a, 64b). Then, both Trusted Processes A and B initialize counters CTR and $CTR_{EXP}$ to protect against fraudulent replay attacks (66a, 66b). The first counter (CTR) is stored in Random Access Memory (RAM) and is set to an initial value (i.e., $CTR_{REPLAY}$) when each process is instantiated. Thereafter, CTR is incremented with each message that is protected and sent to another trusted process. The second counter ($CTR_{EXP}$) is an expected value for CTR. As seen later in more detail, the $CTR_{EXP}$ value is used in a comparison by a process that receives the message to help protect against replay attacks. The third counter, $CTR_{REPLAY}$, is a global value maintained in flash memory and available to both Trusted Processes A and B.

As stated previously, the present invention provides the processes with the ability to selectively determine which messages should be protected. Thus, a comparison is performed for each message (box 68). The comparison may be based on any desired criteria, but in one embodiment, the controller 12 on device 10 determines whether the message to be sent will carry data that should be protected. For example, messages that merely acknowledge (i.e., ACK) a request from another process may not require protection. However, a message carrying multimedia content (e.g., audio or video data) would need protection. If no protection is needed for the data, Trusted Process A simply sends the message unprotected to Trusted Process B (line 76). Otherwise, Trusted Process A performs the functions required to protect the message.

Specifically, in one embodiment, Trusted Process A generates a call to a function GET_UNIQUE_KEY in API 30 (box 70). The function takes RANDOM||CTR as a parameter, which is a random number generated by Trusted Process A concatenated with the value of CTR. The function returns a key as a 256-bit value. This key is unique to the message being encrypted. The most significant 128 bits of the returned value is a key (SC_IC) used for integrity protection. The least significant 128 bits of the returned value (SC_CK) is a key used for confidentiality.

Once generated, Trusted Process A uses the key to encrypt the message (box 72) and then increments CTR before sending the encrypted message to Trusted Process B via the established IPC channel (line 76). For reasons explained more fully below, the message contains the RANDOM number generated by Trusted Process A, as well as the incremented CTR value. Upon receipt of the protected message, Trusted Process B processes the message to extract the data (box 78), and renders the data to the user (box 80).

Figure 5:
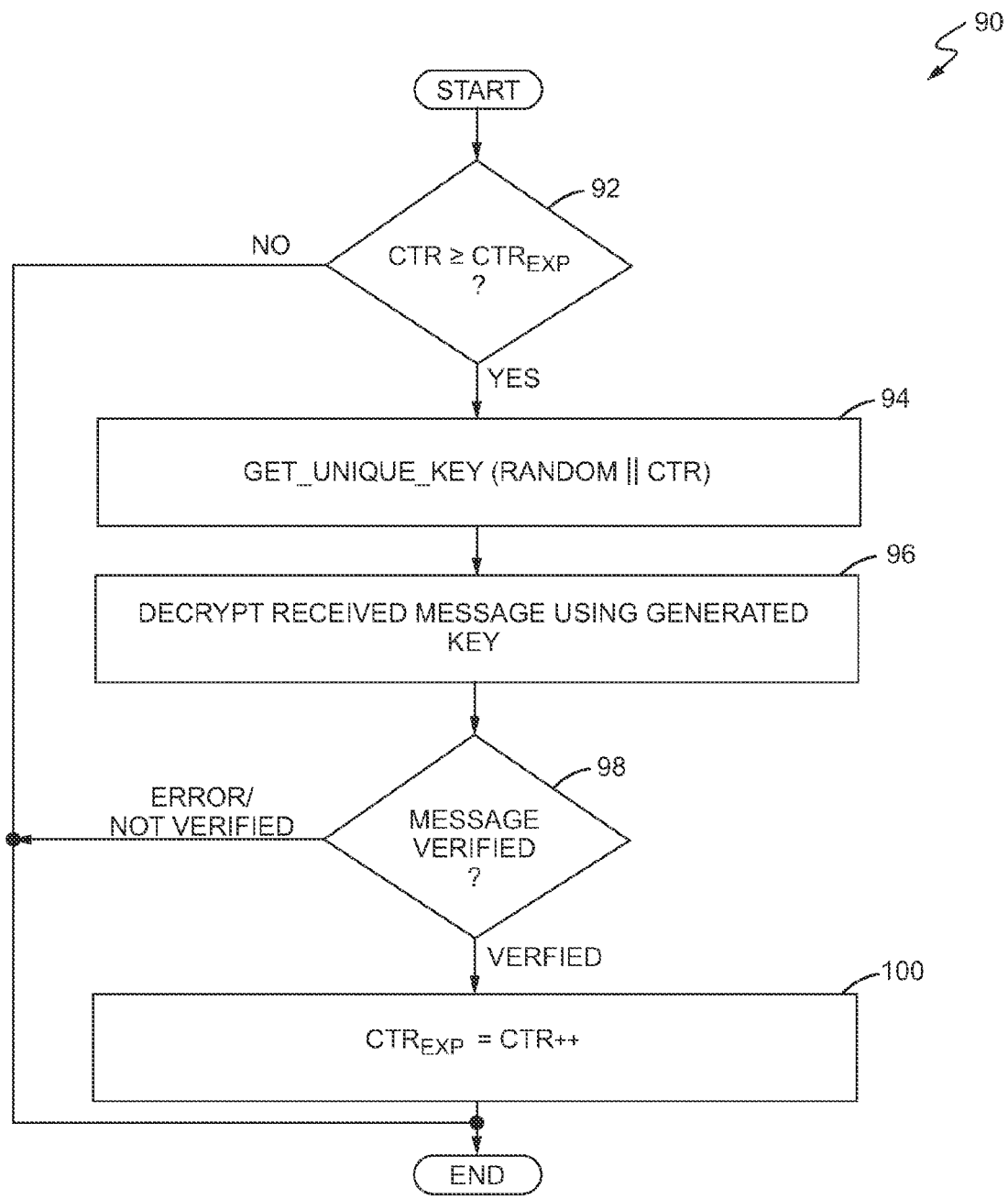
FIG. 5 is a flow diagram illustrating a method by which a process executing on a user device decrypts a received message and applies replay protection according to one embodiment of the present invention.

FIG. 5 is a flow chart illustrating a more detailed method 90 by which the Trusted Process B extracts the data. In the embodiment of FIG. 5, Trusted Process B, upon receiving the message over the IPC communication channel, first compares the CTR value to the expected value of the counter $CTR_{EXP}$ (box 92). As stated above, this comparison is to help protect against replay attacks.

As is well-known in the art, a replay attack is when a malicious application eavesdrops on the IPC channel and records the messages being communicated. Thereafter, the malicious application can contact one of the processes, use the data in the recorded messages to fraudulently authenticate itself as the other process, and request that the process perform some action. Because, based on the stolen data, the trusted process receiving the fraudulent request believes the legitimacy of the malicious application, that trusted process would likely perform the action requested by the malicious application.

To protect against such attacks, the present invention maintains the plurality of different counters CTR, $CTR_{EXP}$, and $CTR_{REPLAY}$. The $CTR_{REPLAY}$ counter, which is globally accessible to all trusted processes, is stored in flash memory and is updated using any means known in the art whenever the device 10 undergoes a hardware reboot. Similarly, because a hardware reboot would also re-instantiate Trusted Processes A and B, the values $CTR_{EXP}$ and CTR are also initiated to the newly updated value of $CTR_{REPLAY}$. Once updated, any malicious application masquerading as Trusted Process A and attempting to contact Trusted Process B would only have an invalid value for CTR. Therefore, Trusted Process B would recognize the request as an illegitimate request and end processing.

If the value for CTR is equal to or exceeds $CTR_{EXP}$ (box 92), Trusted Process B will proceed to generate the same message unique key that was generated by Trusted Process A (box 94). To accomplish this, Trusted Process B will concatenate the random number generated at Trusted Process A and the current value of CTR, and then pass that concatenated value as a parameter to the GET_UNIQUE_KEY function of API 30 to obtain a key. As seen in more detail later, the values for RANDOM and CTR are passed from Trusted Process A to Trusted Process B in an unencrypted part of the message. The GET_UNIQUE_KEY function of API 30 should return the same key that was generated by Trusted Process A to encrypt the message. Thus, with the proper key in hand, Trusted Process B can decrypt the message (box 96).

Once decrypted, Trusted Process B will verify the data (box 98). Verification may be accomplished using any means known in the art, but in one embodiment, Trusted Process B contains the logic needed to perform a CHECKSUM operation on the data. If the CHECKSUM reveals that the message is not valid (box 98), the process ends. Otherwise, Trusted Process B increments CTR and sets the expected value $CTR_{EXP}$ to the value of CTR (box 100).

Figure 6:
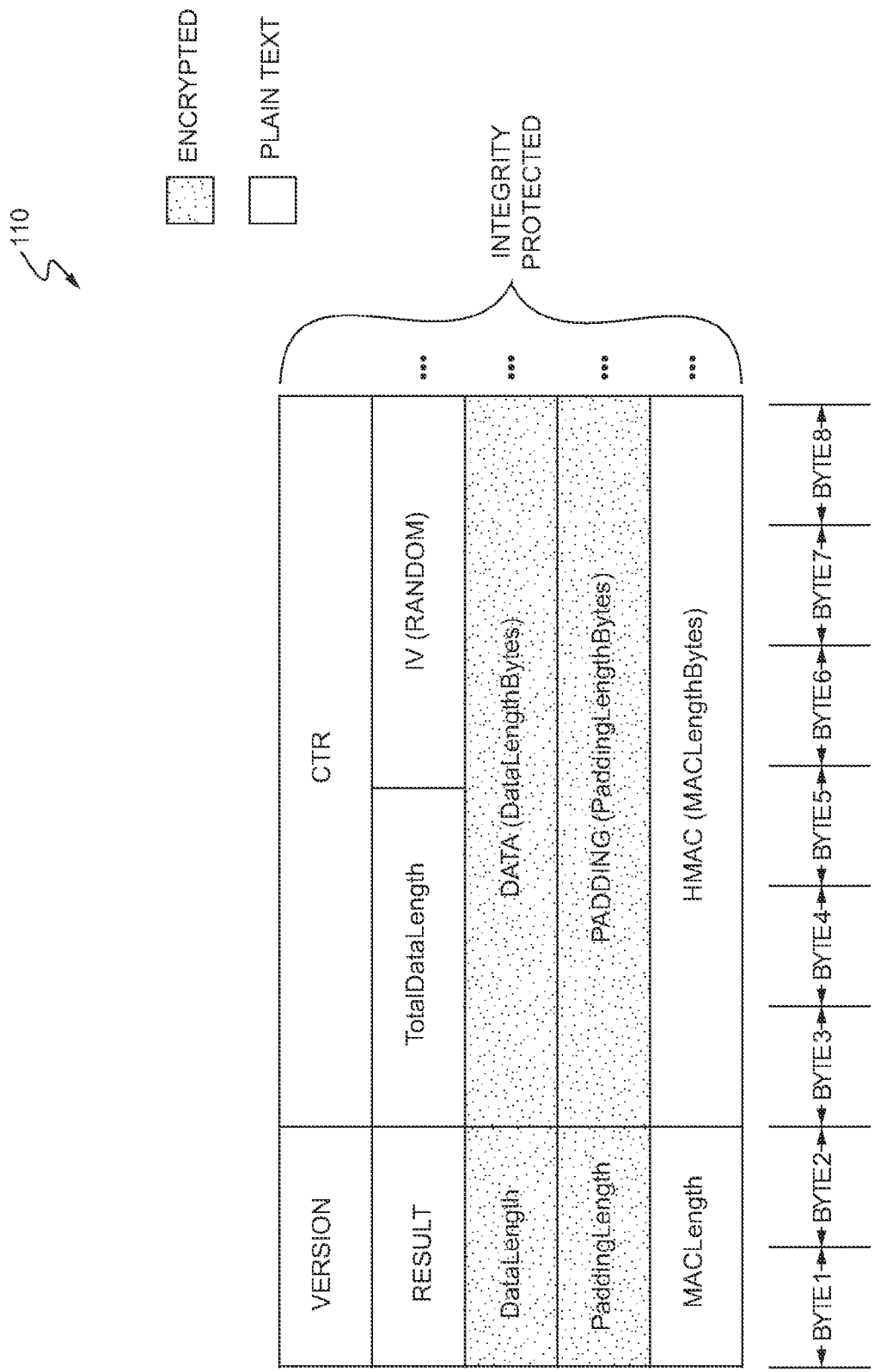
FIG. 6 illustrates an exemplary message structure for carrying data sent between processes executing on a user device according to one embodiment of the present invention.

As stated previously, the present invention utilizes its own message format to ensure that the functionality remains independent of the platform-specific IPC mechanisms. FIG. 6 illustrates a format of a message according to one embodiment of the present invention. As seen in FIG. 6, not all data fields are encrypted. Rather, only the DataLength, Data, PaddingLength, and Padding fields are encrypted, while the remaining fields are clear text. Each field in the message is detailed in the following table.

| FIELD | DESCRIPTION |
| --- | --- |
| Version | The version number of the API 30 |
| CTR | The counter initialized and incremented by the trusted processes for replay protection, and for obtaining a unique key together with the value for RANDOM |
| Result | This is a response code that is returned to a low-level process that sent a message to indicate whether the inter-process communication of the message as successful (e.g., Trusted Process B may return the Result code to Trusted Process A). |
| TotalDataLength | This is the total length of the encrypted data. The TotalDataLength field is sent in plain text so that the receiving low-level process knows how much data to decrypt. |
| IV(Random) | The RANDOM number generated and used by trusted processes together with CTR to obtain a unique key. The IV is randomly generated for each message. |
| DataLength | The length of the data |
| Data | The data being communicated between trusted processes |
| PaddingLength | The length of the padding bytes, if any |
| Padding | Bytes used to pad the message |
| MACLength | The length in bytes of the HMAC |
| HMAC | Hashed Message Authentication Code |

In addition, the present invention is also configured to provide end-to-end security for each message, even if not all processes in the chain of processes are trusted. For example, as seen in the signal diagram 120 of FIG. 7, Trusted Process A is able to send a protected message to Trusted Process B through one or more untrusted processes 122. As above, the present invention assumes that the requisite IPC channels for carrying data messages between the processes 42, 122, 44 are already established (lines 124, 126).

Figure 7:
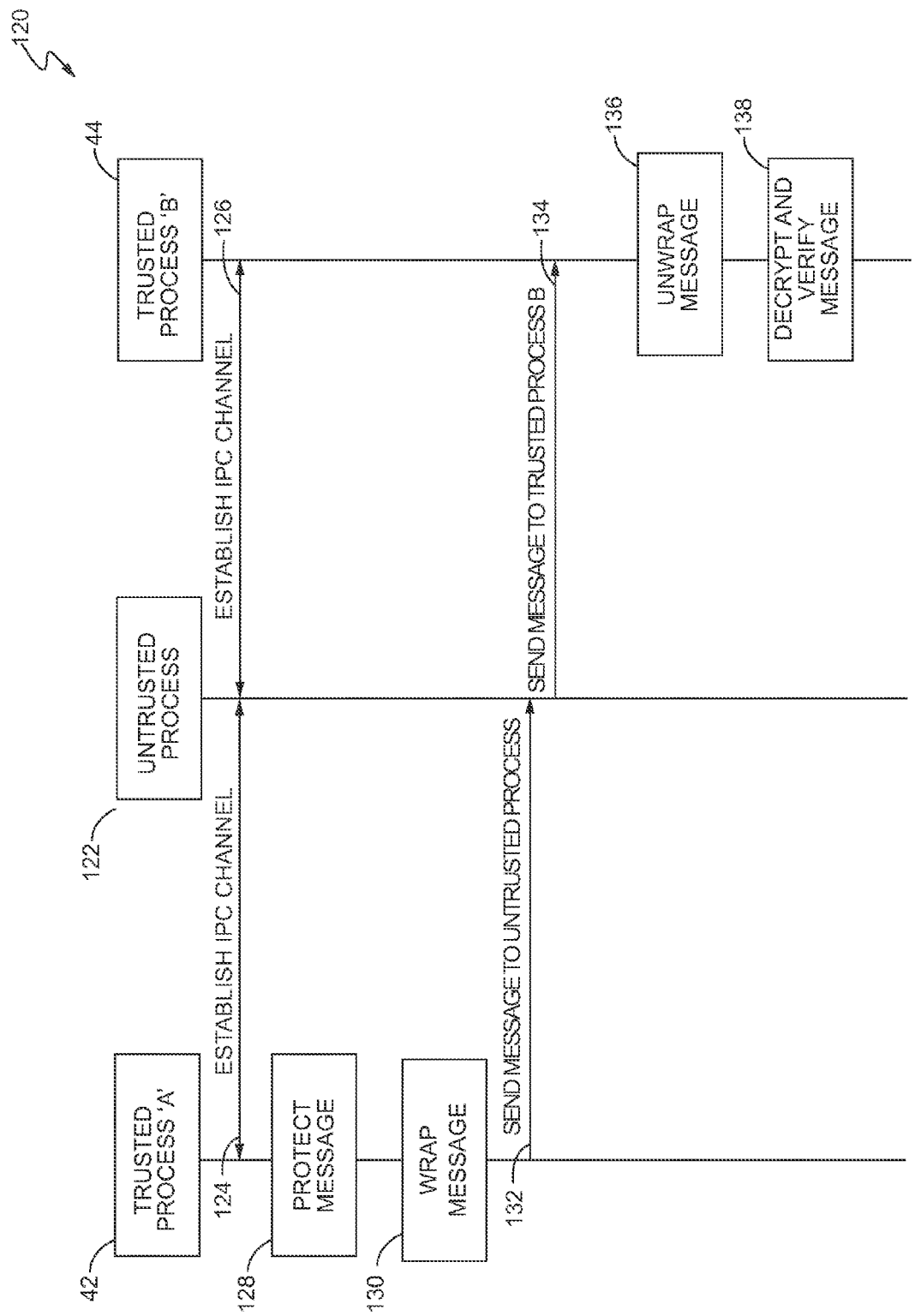
FIG. 7 is a signaling diagram illustrating how a trusted process sends a message to another trusted process via one or more untrusted processes.

As seen in FIG. 7, Trusted Process A first performs the functions described above to protect a message (box 128). Once protected, Trusted Process A wraps the message (box 130) and sends the message to the Untrusted Process 122 via the established IP channel (line 132). Upon receipt, the Untrusted Process 122 will not be able to decrypt the message, and thus, simply forwards the encrypted message to Trusted Process B via the established IPC channel (line 134). Trusted Process B then unwraps the message (box 136), and decrypts and verifies the message (box 138), as previously described.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for providing secure Inter-Process Communications (IPC) between first and second processes executing on a same user device, the method comprising:
   establishing an IPC channel between first and second processes executing on a same user device, wherein the IPC channel configured to carry a plurality of messages sent by the first process to the second process;
   initializing, for each of the first and second processes, a respective first and second instance of a security function on the user device, wherein the security function is stored on the user device and is accessible to both the first and second processes; and
   by the first process:
      for each message in the plurality of messages to be sent to the second process, selectively determining whether the message is to be protected;
      if the message is to be protected:
         controlling the first instance of the security function to generate a unique key for the message based on parameter value generated by the first process;
         encrypting the message using the unique key such that the message comprises an encrypted portion and an unencrypted portion; and
         sending the encrypted message to the second process over the established IPC channel; and
      if the message is not to be protected:
         sending the message unencrypted to the second process over the established IPC channel.

2. The method of claim 1 further comprising initializing selected parameter values to provide as input into the first instance of the security function to protect against replay attacks on the plurality of messages being sent to the second process over the IPC channel.

3. The method of claim 1 wherein selectively determining whether the message is to be protected comprises determining whether the message includes data that is to be protected.

4. The method of claim 3 wherein encrypting the message comprises encrypting only the portion of the message that includes the data to be protected.

5. The method of claim 1 wherein controlling the first instance of the security function to generate a unique key for the message comprises:
   providing the first instance of the security function with the parameter value;
   receiving the unique key from the first instance of the security function; and
   updating the parameter value to use in generating another unique key to encrypt a subsequent message.

6. The method of claim 1 wherein the first and second processes comprise trusted processes, and wherein establishing the IPC between the first and second processes comprises establishing the IPC channel through an untrusted process executing on the user device.

7. A user device comprising:
   a memory configured to store a security function; and
   a programmable processing circuit communicatively connected to the memory and configured to:
      establish an IPC channel between first and second processes executing on the user device, wherein the IPC channel is configured to carry a plurality of messages sent by the first process to the second process;
      initialize, for each of the first and second processes, respective first and second instances of the security function on the user device;
      for the first process:
         for each message in the plurality of messages to be sent to the second process, selectively determine whether the message is to be protected;
         if the message is to be protected:
            control the first instance of the security function to generate a unique key for the message based on a parameter value generated by the first process;
            encrypt the message based on the unique key such that the message comprises an encrypted portion and an unencrypted portion; and
            send the encrypted message to the second process over the established IPC channel; and
         if the message is not to be protected:
            sending the message unencrypted to the second process over the established IPC channel.

8. The user device of claim 7 wherein the programmable processing circuit is further configured to initialize selected parameter values to input into the first instance of the security function to protect against replay attacks on the plurality of messages being sent to the second process over the IPC channel.

9. The user device of claim 7 wherein the programmable processing circuit is configured to selectively determine whether the message is to be protected by determining whether the message includes data that is to be protected.

10. The user device of claim 9 wherein the programmable processing circuit is configured to encrypt only the portion of the message that includes the data to be protected.

11. The user device of claim 7 wherein the programmable processing circuit is further configured to control the first instance of the security function to generate the unique key for the message based on the parameter value generated by the first process.

12. The user device of claim 11 wherein to control the first instance of the security function to generate the unique key, the programmable processing circuit is configured to:
   provide the first instance of the security function executing on the user device with the parameter value;
   receive the unique key from the first instance of the security function; and update the parameter value to use in controlling the first instance of the security function to generate another unique key to encrypt a subsequent message.

13. The user device of claim 7 wherein the first and second processes comprise trusted processes, and wherein the programmable processing circuit is configured to establish the IPC between the first and second processes by establishing the IPC channel through an untrusted process executing on the user device.

14. A method for providing secure Inter-Process Communications (IPC) between first and second processes executing on a same user device, the method comprising:
   initializing respective first and second instances of a security function on the user device for each of the first and second processes, wherein the security is accessible to both the first and second processes;
   by the second process:
      receiving encrypted and unencrypted messages over IPC channel from the first process, wherein the encrypted messages comprise an encrypted portion and an unencrypted portion;
      comparing a parameter value received with an encrypted message to an expected parameter value maintained by the second process;
      controlling the second instance of the security function to generate a unique key for the encrypted message based on the parameter value received with the encrypted message; and
      decrypting the encrypted portion of the encrypted message using the unique key based on the comparison.

15. The method of claim 14 wherein decrypting the encrypted portion of the encrypted message based on the comparison comprises decrypting the encrypted portion of the encrypted message if the parameter value received with the encrypted message equals or exceeds the expected value maintained by the second process.

16. The method of claim 14, further comprising initializing selected parameter values to provide as input into the second instance of the security function to protect against replay attacks on the encrypted and unencrypted messages received over the IPC channel.

17. The method of claim 14 wherein controlling the second instance of the security function to generate a unique key for the encrypted message comprises:
   providing the second instance of the security function executing on the user device with the parameter value received with the encrypted message;
   receiving the unique key from the second instance of the security function in which the unique key is unique to the encrypted message and is the same key that was used by the first process to encrypt the encrypted message; and
   update the expected parameter value to use in comparing another parameter received with a subsequent encrypted message over the IPC channel.

18. A user device comprising:
   a memory configured to store a security function; and
   a programmable processing circuit configured to execute first and second processes on the user device, and to:
      establish an IPC channel between the first and second processes;
      initialize a respective first and second instance of a security function on the user device for each of the first and second processes; and
      for the second process:
         receive encrypted and unencrypted messages sent by the first process over the IPC channel to the second process, the encrypted messages comprising an encrypted portion and an unencrypted portion;
         compare a parameter value received with an encrypted message to an expected parameter value maintained the second process;
         control the second instance of the security function to generate a unique key for the encrypted message based on the parameter value received with the encrypted message; and
         decrypt the encrypted portion of the encrypted message using the unique key based on the comparison.

19. The user device of claim 18 wherein the programmable processing circuit is configured to decrypt the encrypted portion of the encrypted message if the parameter value received with the encrypted message equals or exceeds the expected value maintained by the second process.

20. The user device of claim 18, wherein the programmable processing circuit is further configured to initialize selected parameter values to provide as input into the second instance of the security function to protect against replay attacks on the encrypted and unencrypted messages received over the IPC channel.

21. The user device of claim 18 wherein the programmable processing circuit is further configured to:
   provide the second instance of the security function executing on the user device with the parameter value received with the encrypted message to generate the unique key for the encrypted message;
   receive the unique key from the second instance of the security function in which the unique key is unique to the encrypted message and is the same key that was used by the first process to encrypt the encrypted message; and
   update the expected parameter value to use in comparing another parameter value received with a subsequent encrypted message from the first process over the IPC channel.

* * * * *